(12) United States Patent
Knepper et al.

(10) Patent No.: US 11,083,129 B2
(45) Date of Patent: Aug. 10, 2021

(54) ROTATIONAL TUBE MATERIAL SPREADING DEVICE

(71) Applicants: D. Keith Knepper, Kirkwood, MO (US); Amy Hamilton, Elk Creek, MO (US); Colt Hamilton, Elk Creek, MO (US)

(72) Inventors: D. Keith Knepper, Kirkwood, MO (US); Amy Hamilton, Elk Creek, MO (US); Colt Hamilton, Elk Creek, MO (US)

(*) Notice: Subject to any disclaimer, the term of this patent is extended or adjusted under 35 U.S.C. 154(b) by 0 days.

(21) Appl. No.: 16/371,926

(22) Filed: Apr. 1, 2019

(65) Prior Publication Data

US 2020/0305340 A1    Oct. 1, 2020

(51) Int. Cl.

| | |
|---|---|
| *A01C 7/12* | (2006.01) |
| *B05B 13/00* | (2006.01) |
| *B65G 47/18* | (2006.01) |
| *A01C 15/00* | (2006.01) |
| *A01C 19/02* | (2006.01) |
| *A01M 9/00* | (2006.01) |
| *E01H 10/00* | (2006.01) |
| *B64C 39/02* | (2006.01) |
| *B64D 47/08* | (2006.01) |
| *B64C 25/04* | (2006.01) |
| *B64D 1/18* | (2006.01) |
| *B05B 12/00* | (2018.01) |

(52) U.S. Cl.
CPC ............ *A01C 7/126* (2013.01); *A01C 7/125* (2013.01); *A01C 15/00* (2013.01); *A01C 19/02* (2013.01); *A01M 9/0069* (2013.01); *B05B 12/004* (2013.01); *B05B 13/00* (2013.01); *B64C 25/04* (2013.01); *B64C 39/024* (2013.01); *B64D 1/18* (2013.01); *B64D 47/08* (2013.01); *B65G 47/18* (2013.01); *E01H 10/007* (2013.01); *B64C 2201/126* (2013.01); *B64C 2201/127* (2013.01); *B64C 2201/141* (2013.01)

(58) Field of Classification Search
CPC ......... A01C 7/126; A01C 7/125; A01C 15/00; A01C 19/02; A01M 9/0069; B05B 12/004; B05B 13/00; B64C 25/04; B64C 39/024; B64C 2201/126; B64C 2201/127; B64C 2201/141; B64D 1/18; B64D 47/08; B65G 47/18; E01H 10/007
USPC ............... 239/661, 668, 669, 681, 684, 689
See application file for complete search history.

(56) References Cited

U.S. PATENT DOCUMENTS

| 3,756,509 A * | 9/1973 | Hamnes ................ E01C 19/202 239/675 |
| 4,892,255 A * | 1/1990 | Waldrum ............ A01M 9/0061 239/682 |
| 2008/0023504 A1 * | 1/2008 | Gaughan ................. A01C 3/06 222/623 |

\* cited by examiner

*Primary Examiner* — Christopher S Kim
(74) *Attorney, Agent, or Firm* — Malone IP Law; Steven J. Malone

(57) ABSTRACT

A spreader device includes a hopper axially mounted above a generally circular hollow tube, the generally circular hollow tube forming a semi-circular hopper floor of an interior area formed by the hopper, and a drive motor assembly attached to the hopper and operable to rotate the generally circular hollow tube within at least a portion of the interior area formed by the hopper.

18 Claims, 15 Drawing Sheets

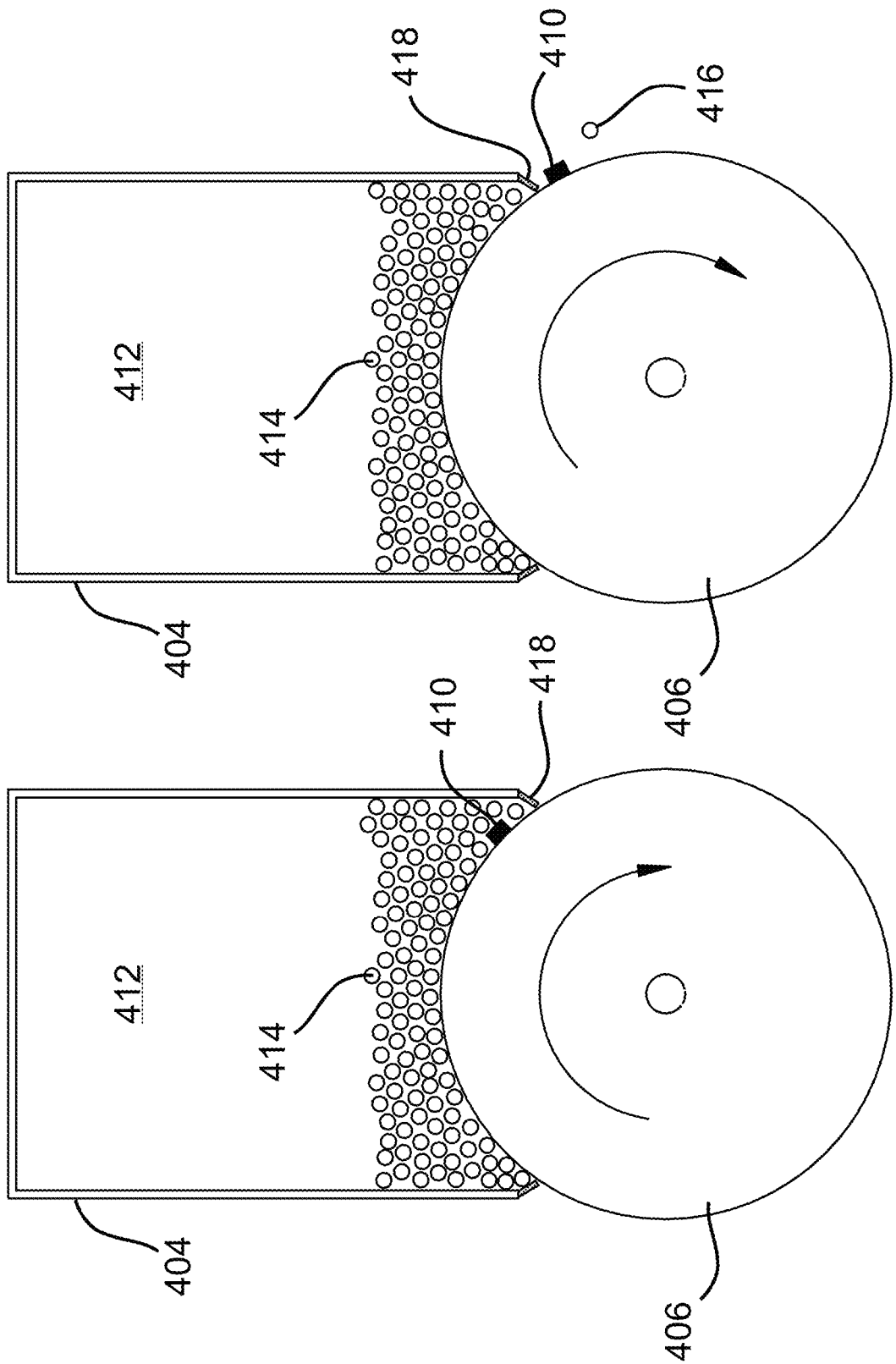

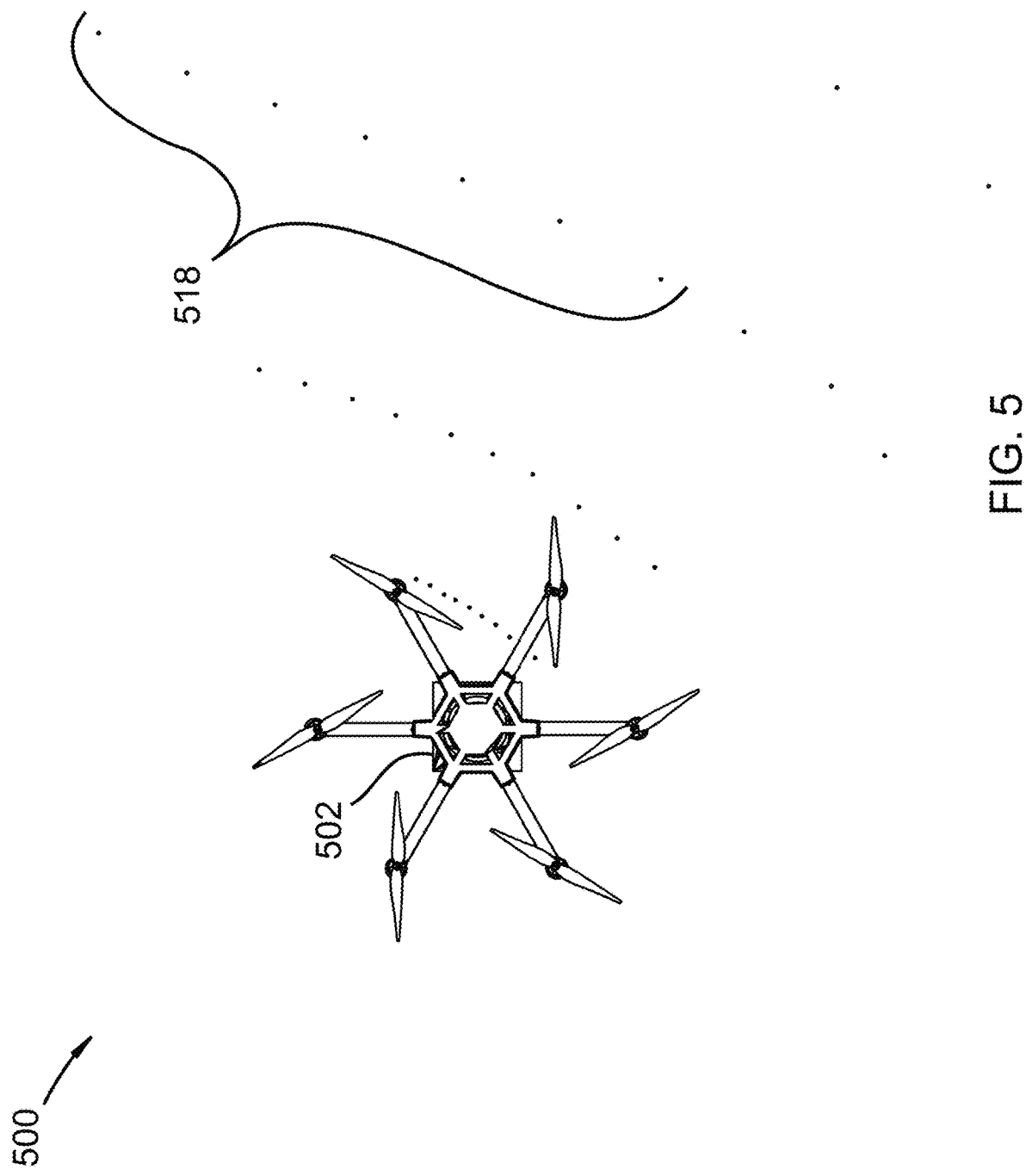

ROTATIONAL TUBE MATERIAL SPREADING DEVICE

FIELD OF THE INVENTION

The disclosed novelty relates generally to the field of agriculture, conservation, landscaping, and material spreading and more specifically to spreading materials using a rotational tube material spreading device.

BACKGROUND

A solution is needed which allows material to be applied to land areas where traditional land based equipment cannot easily, timely, and safely reach due to obstacles and land conditions such as steep or rocky slopes, lands with ditches, gulleys and openings, wet or recently flooded and timbered areas, river banks, dry creeks, under trees in savannas, woodlands/forest, pastures, and snowy/icy areas. Additional areas include where it is not economical or safe to use traditional land based equipment or where soil compaction or near harvest crop is to be avoided

SUMMARY

A spreader device includes a hopper axially mounted above a generally circular hollow tube, the generally circular hollow tube forming a semi-circular hopper floor of an interior area formed by the hopper, and a drive motor assembly attached to the hopper and operable to rotate the generally circular hollow tube within at least a portion of the interior area formed by the hopper.

The hollow tube outer surface may include one or more: protruding features, recessed features, corrugated features, or a combination thereof. A helical pattern, a "V" shaped pattern, or a scrolling pattern may be formed on the outer surface of the hollow tube as a result of the protruding features, the recessed features, the corrugated features, or a combination thereof. The drive motor assembly may be attached to the hopper and located inside of the generally circular hollow tube. The hopper may be at least partially enclosed by a lightweight fabric. The spreader device may further comprise a variable speed motor that powers the drive motor assembly. The spreader device may further comprise an aerial vehicle attached to the spreader device. The variable speed motor may be at least partially controlled by a speed of the aerial vehicle. The diameter of the generally circular hollow tube may be larger than the width of the hopper. The spreader device may further comprising a tractor, snowplow, lawn mower, drone, UAV (unmanned aerial vehicle), ATV (all terrain vehicle), or manned aerial vehicle attached to the spreader device. The spreader device may spread contents of the hopper in a uniform pattern and density. The spreader device may attach to the spreader device by one or more sliding rods. The spreader device may spread contents of the hopper in a uniform density based on the speed of the aerial vehicle and a speed of the variable speed motor. The spreader device may further comprise a camera system. The aerial vehicle may comprise a guidance system. A start trigger and a stop trigger of the spreader device may be, at least partially, determined based on a signal from the guidance system or landing gear of the aerial vehicle. The guidance system may comprise one or more wireless location detection systems. The guidance system may include one or more altimeters, pressure transducers, gyroscopes, accelerometers, airspeed detectors, airspeed direction detectors, strain gages, weight detectors, sonar transceivers, radar transceivers, or LiDAR (light detection and ranging) transceivers. The spreader device may include a motor controller that controls the variable speed motor. The camera may be used to at least partially control the speed of the variable speed motor. The camera system may record a distribution pattern and density as contents of the hopper are expelled by the generally circular hollow tube as the generally circular hollow tube rotates.

In one embodiment, farmers, ranchers, landowners, land managers, land organizations, and government agencies who perform actions on the land can take advantage of the rotational tube material-spreading device to spread material such as seeds, fertilizers, pesticides, insecticides, or other materials used to treat, plant, or prepare land areas. Application times of seeds, due to the ease of use of the rotational tube material spreading device, allows for increased crop production at lower costs and efforts. This is an advantage of automated scheduling and in select cases the cost of a traditional manned aircraft aerial applications.

In another embodiment, landowners, land managers, land organizations, and government agencies who perform actions on the land can take advantage of the high precision nature of the rotational tube material spreading device to apply material in specific areas. Areas of the land where the 1st pass may have not produced good results from traditional land equipment or manned aircraft or negatively impacted by weather and requires a much smaller area for a 2nd pass treatment in order to achieve your land management goals. The manned aircraft aerial applications are not as precise as the rotational tube material spreading device applications or not suited for multiple smaller areas and around obstacles such as described below. Flights can be performed nearer to the areas, closer to ground, precisely within the areas and made to hoover in a single spot. The flight path over the ground can be electronically stored and easily repeated for precise application such as, seeding, fertilizing or monitoring with the hopper device carrying different medium to accomplish land management goals.

Problems with applying seed mixes to rough land, applying grasses, forbs and legumes seed mixes are challenging due to the physical structure of the seeds and allow the seed to free flow during the planting of these seeds. Prior art spreader devices have problems of x forces within the seed mixes causing cavitation and thus preventing the mix from flowing out of seeder devices or flowing out in a uniform distribution pattern. Many land areas physically preclude farmers, ranchers and landowners and others who perform actions on the land from actions, such as, seeding with traditional ground based equipment due to the condition or status of the land and the unproductive nature of the land. Safety is improved by not having a human walk down and up and over rough lands. UAV/drone spreading devices for actions, such as, seeding and fertilization or other monitoring missions can be flown over lands that remains wet along river areas, stream areas, riparian restoration areas, gullies, recently flooded areas, difficult land that is hard to reach or hard or general unsafe to walk, timbered lands, and areas with fallen trees, tree stumps, debris, obstacles, and steep slopes. Other areas of interest are lands that are impacted by ground equipment such as sensitive plants, soil compaction, land with rocky or steep slopes in fields, glades, savannas, woodlands, and forests where traditional equipment is deemed not safe by the farmer, rancher or landowner. Land areas where material such as, seeds are desired next to obstacles such as power lines, towers, legal boundaries, roads and water can be more accurately be seeded with smaller drones with hover capabilities than fixed wing drones and manned crop duster type of aircraft.

In another embodiment, the rotational tube material spreading device provides cover crop over seeding of existing crops and no damage to those existing crops. Traditional aircraft seeding methods is constrained by aircraft space for the seed mix bags (grass seed is bulkier than other seed mixes) and thus makes in most grass mix seeding situations is cost prohibitive and untimely seeding activities such as, manned aircraft fuel cost of multiple flights to the airport and the over-demand schedule of manned aircraft after flooded and drought conditions.

In another embodiment, the present invention supports the rebuilding and maintaining of soil health/ecosystems. Grasslands including grasses, forbs and legumes are an integral part of our agriculture and conservation ecosystems. Diverse native ground cover provide food for grazing herbivores, both domesticated and wild, provides habitat and food for insects and birds and other wildlife species, and both deep and shallow root systems to support and regenerate better soil health and structure. In areas where the diverse native seedbed and plants has been depleted in rough land units, the present invention provides an important tool of helping regeneration and land production for plant harvest, pollinators, wildlife, livestock and conservation concerns including flood reduction through infiltration, reversal of species depletion, and nature functioning for the future of society.

In another embodiment, the rotational tube material spreading devices provides food materials such as corn kernels to feed or treat wildlife through solid vaccinations. Food can also be placed as bate over the period of days to the same precise land areas through the stored GPS repeatable paths in order to attract wildlife, such as, sick deer with Chronic Wasting Disease (CWD), or land damaging illegal feral wildlife, such as, hogs, for government and conservation agencies and landowners to take appropriate timely measures.

In another embodiment, the rotational tube material spreading device provides a method of applying materials such as seeds, salts, fertilizers, pesticides, insecticides, and any other material that is helpful when applied to land, ground, road, sidewalk and/or grass areas. The rotational tube material spreading device may be used as an independent device (held by a person walking), attached to a drone, attached to a lawn mower, attached to a robot, attached to an ATV, attached to a four wheeler, attached to a tractor, attached to a bicycle, attached to a motor cycle, attached to a motor vehicle, attached to a manned or unmanned vehicle, attached to a manned our unmanned aerial vehicle (UAV), or to water craft, a boat, or hover craft.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 4A and 4B are each side views of a rotational tube material spreading device in accordance with an embodiment of the invention;

FIG. 5 is a top view of a rotational tube material spreading device in accordance with an embodiment of the invention;

DETAILED DESCRIPTION

It will be readily understood that the components of the present invention, as generally described and illustrated in the Figures herein, may be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
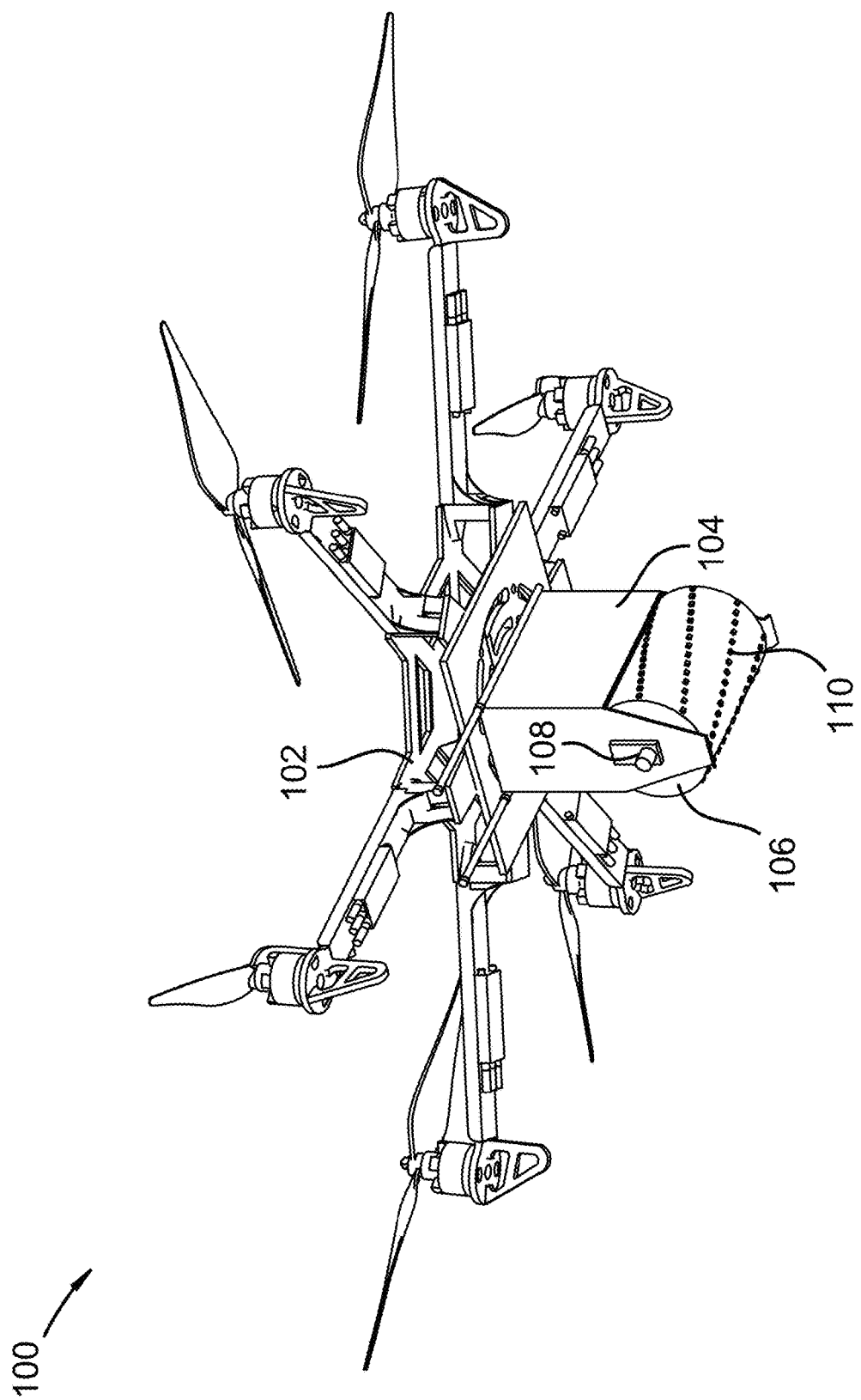
FIG. 1 is a perspective view of a rotational tube material spreading device in accordance with an embodiment of the invention.

Referring to FIG. 1, a rotational tube material spreading device 100 includes transport 102, material hopper 104, rotational tube 106, drive motor assembly 108, and rotational tube features 110. Transport 102 may be a drone (shown in FIG. 1), unmanned aerial vehicle (UAV), a person holding material hopper 104 and walking along, a motor vehicle, a tractor, watercraft, a lawn mower, a bicycle, a motor cycle, an all terrain vehicle (ATV), or a utility terrain vehicle (UTV). Material hopper 104 is located above rotational tube 106 such that gravity feeds material in the hopper against a rotational surface of rotational tube 106. Drive motor assembly 108 provides necessary rotational drive forces to move rotational tube 106 while material within the material hopper is pressing against an outer surface of rotational tube 106 within material hopper 104. Drive motor assembly 108 may include gears, belts, motors, chains, motor drive controls, communication controls, positioning systems, and circuitry necessary to move rotational tube 106 in a controlled, variable speed, location aware manor. In one embodiment, drive motor assembly 108 and battery are centrally located within rotational tube 106 providing a needed balance for the transport 102. The battery may also be external to the rotational tube allowing for easy battery swapping. In another embodiment, drive motor assembly 108 is located on a side of rotational tube 106. A battery may be attached on the opposite side with a similar weight to that of the drive motor assembly 108 providing balance for transport 102. In other embodiments, such as ground-based material applications (tractors, lawnmowers, ATVs, etc.), a balance may not be necessary and the drive motor assembly 108 and battery may be internal, external, or internal and external to the rotational tube 106. Rotational tube features 110 may be protruding features, recessed features, corrugated features, or a combination thereof. Rotational tube feature 110 may form spiraling lines, "V" shaped patterns, scrolling patterns, helical lines, or other patterns that allow material within material hopper 104 to be evenly distributed on the surface of rotational tube 106 within material hopper 104 and evenly extracted from within material hopper 106 as the material is being extracted, thus preventing cavitation at the interface.

Figure 2:
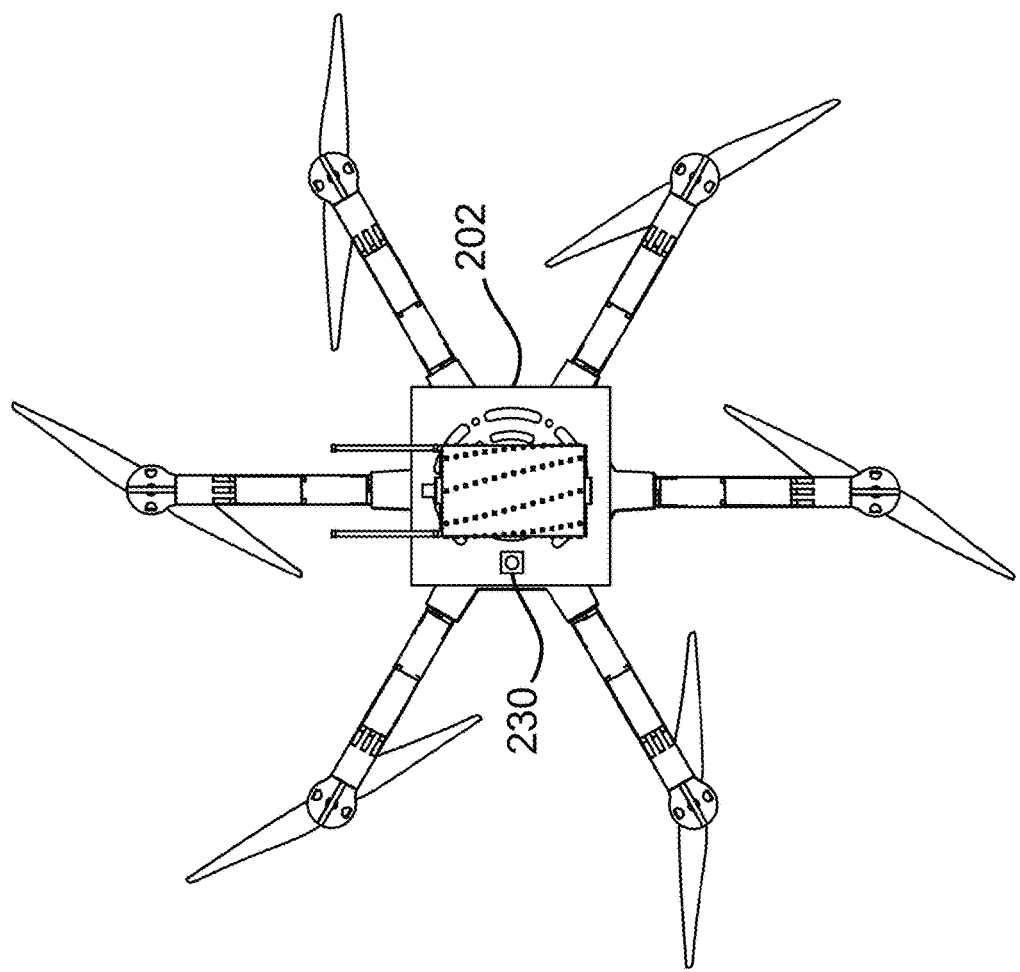
FIG. 2 is a bottom view of a rotational tube material spreading device in accordance with an embodiment of the present invention.

FIG. 2 shows a bottom view 200 of a rotational tube material spreading device in accordance with an embodiment of the present invention. A mounting plate 202 may be used to mount the material hopper to a transport device. A camera 230 may be attached to the transport device, mounting plate or material hopper for visual feedback to operator and for viewing a distribution pattern and density of material being spread by rotational material spreading device 200. Camera 230 may provide feedback to a controller that controls the speed of the rotational tube. Camera 230 may also provide altitude information allowing for controlled starting and stopping of the rotational tube. Camera 230 may additionally take live streaming video feeds and images that are stored in memory for verification of areas treated by material spreading device 200.

Figures 3A, 3B:
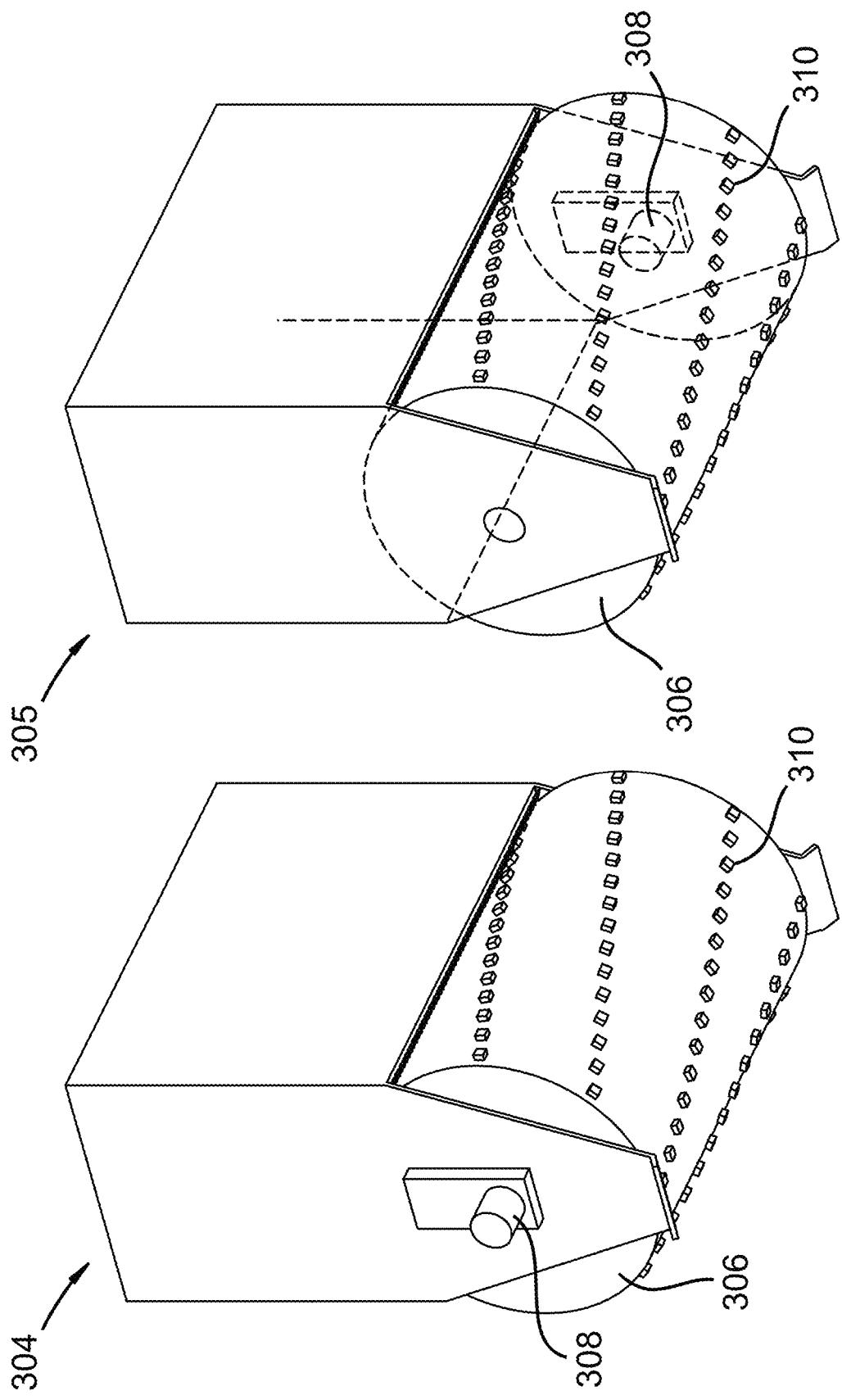
FIGS. 3A and 3B are each perspective views of a rotational tube material spreading device in accordance with an embodiment of the invention.

Referring to FIGS. 3A and 3B, a rotational tube material spreading device includes material hoppers 304/305, rotational tubes 306, drive motor assemblies 308, and rotational tube features 310. Transport may be a drone (shown in FIG. 1), unmanned aerial vehicle (UAV), a person holding material hopper 304/305 and walking along, a motor vehicle, a tractor, watercraft, a lawn mower, a bicycle, a motor cycle, an all terrain vehicle (ATV), or a utility terrain vehicle (UTV). Material hopper 304/305 is located above rotational tube 306 such that gravity feeds material in the hopper against a rotational surface of rotational tube 306. Drive motor assembly 308 provides necessary rotational drive forces to move rotational tube 306 while material within the material hopper is pressing against an outer surface of rotational tube 306 within material hopper 304/305. Drive motor assembly 308 may include gears, belts, motors, motor drive controls, communication controls, positioning systems, and circuitry necessary to move rotational tube 306 in a controlled, variable speed, location aware manor. In one embodiment, drive motor assembly 308 and battery are centrally located within rotational tube 306 providing a needed balance for transport. The battery may also be external to the rotational tube allowing for easy battery swapping. In another embodiment, drive motor assembly 308 is located on a side of rotational tube 306. A battery may be attached on the opposite side with a similar weight to that of the drive motor assembly 308 providing balance for transport. In other embodiments, such as ground-based material applications (tractors, lawnmowers, ATVs, etc.), a balance may not be necessary and the drive motor assembly 108 and battery may be internal, external, or internal and external to the rotational tube 306. Rotational tube features 310 may be protruding features, recessed features, corrugated features, or a combination thereof. Rotational tube feature 310 may form spiraling lines, "V" shaped patterns, scrolling patterns, helical lines, or other patterns that allow material within material hopper 304/305 to be evenly distributed on the surface of rotational tube 306 within material hopper 304/305 and evenly extracted from within material hopper 306 as the material is being extracted, thus preventing cavitation of the hopper material within the hopper.

Figure 3D:
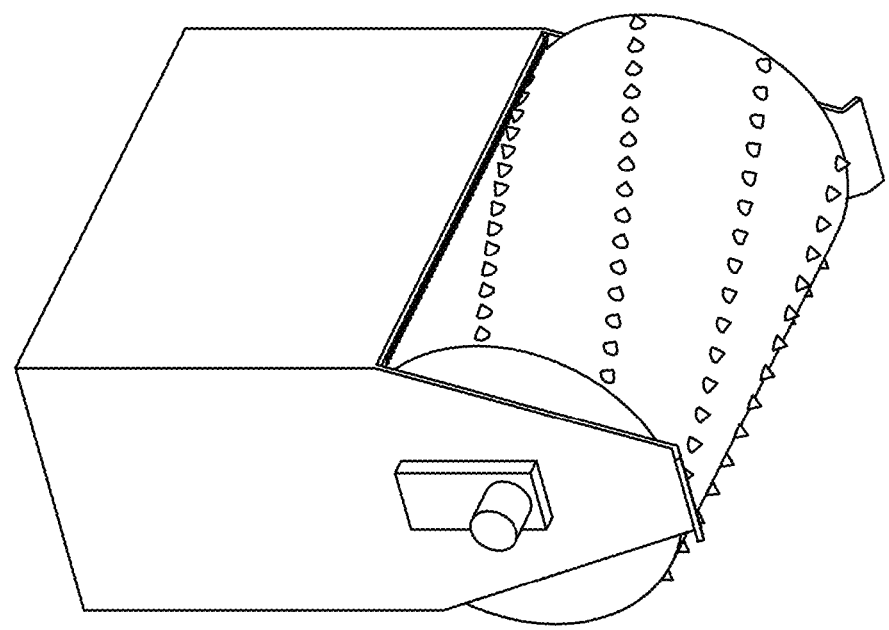
FIG. 3D is a perspective view of a rotational tube material spreading device in accordance with an embodiment of the invention.
Figure 3C:
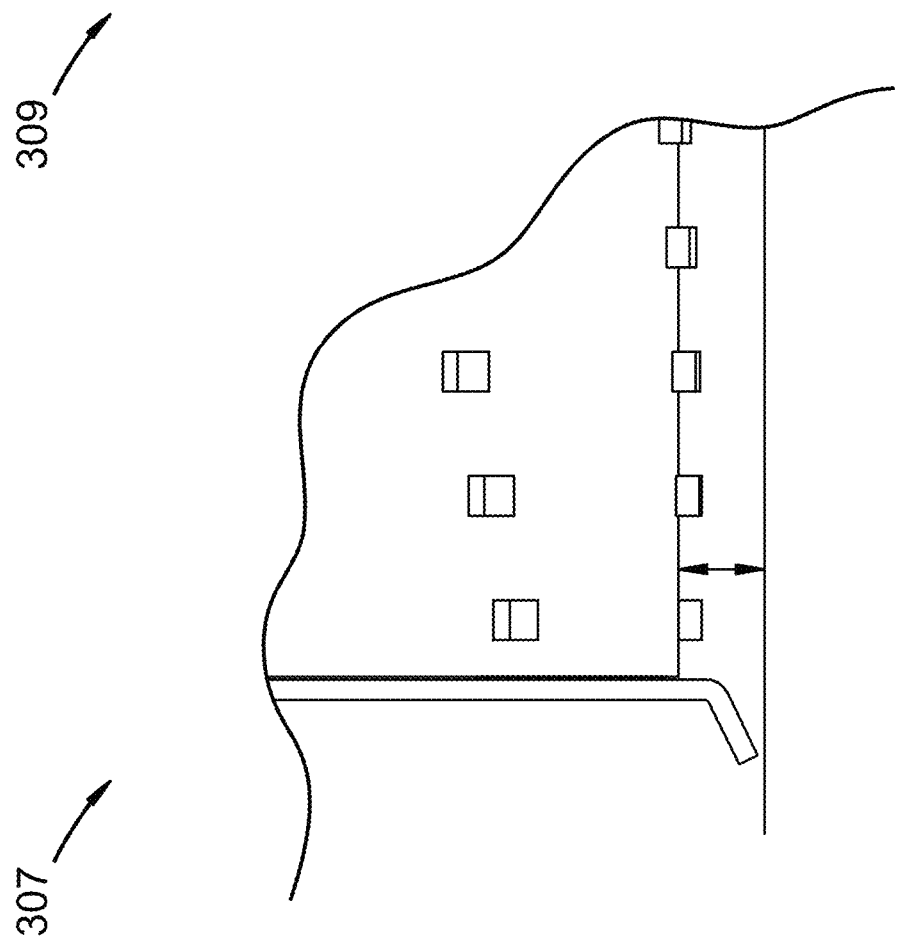
FIG. 3C is a cutout view of a rotational tube material spreading device in accordance with an embodiment of the invention.

Referring to FIGS. 3C and 3D, FIG. 3C is a cutout view 307 of FIG. 3D showing a clearance created by a sides of material hopper extending beyond the rotational tube following a landing foot on each side of the rotational tube. FIG. 3D shows a full view of the extension of the sides of the material hopper 309 with a foot formed on each side formed by an angled bend.

Figure 3E:
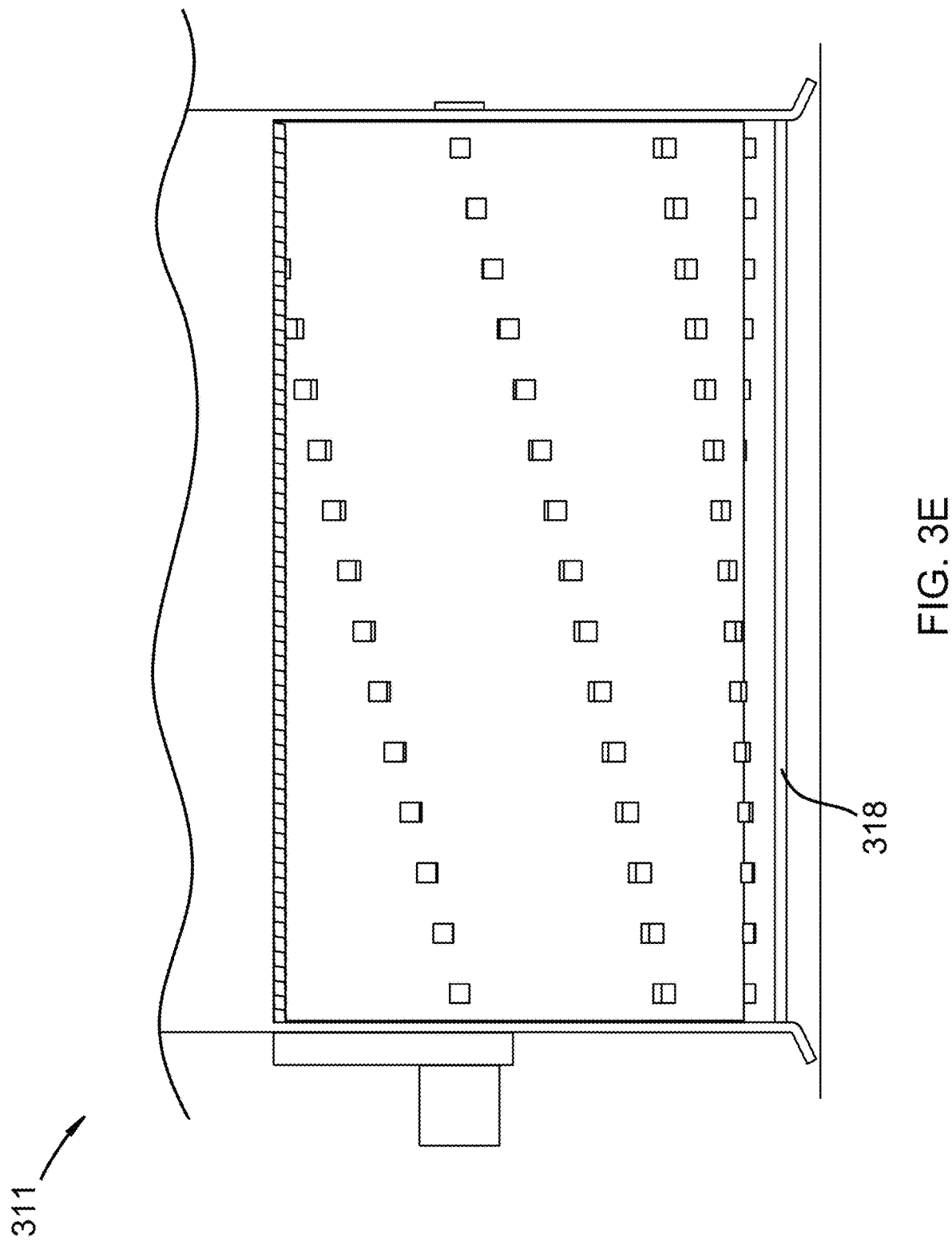
FIG. 3E is a front view of a rotational tube material spreading device in accordance with an embodiment of the invention.

FIG. 3E is a front view of a rotational tube material spreading device 311 in accordance with an embodiment of the invention. FIG. 3E is similar to 3D except for the cross brace 318 between the landing feet. The cross brace 318 mechanically aids in protecting the tube and strengthens the landing feet.

FIGS. 4A and 4B are each side views of a rotational tube material spreading device in accordance with an embodiment of the invention. FIGS. 4A and 4B show material hoppers 404 with an inner area 412 with material 414 inside of the inner area 412. Inner area 412 is enclosed by a semi-circular bottom floor formed by rotational tube 406. Material 414 may be any type material capable of being expelled by rotational tube 406. As rotational tube 406 is rotated, material 416 is expelled as a result of rotational tube surface feature 410. Rotational feature 410 may be protruding features, recessed features, corrugated features, or a combination thereof. Pliable opening 418 may be formed between rotational tube 406 and material hopper 404 allowing for expulsion of material 416. Pliable material may be formed from fur, nylon, brush material, hairlike material, synthetic materials, pliable sweep material, and/or any other pliable material which allows expulsion of material 416 while holding in hopper material 414. Patterns formed on the surface of rotational tube 406 by features 410 enable material 414 to be selectively extracted, in an orderly fashion, preventing cavitation of material 414 the inner area 412.

FIG. 5 shows a rotational tube material spreading device 502 in flight with a distribution pattern 518 of material being spread. The distribution pattern is formed by a speed of the rotational tube, movement of the material spreading device 502, altitude of material spreading device, and wind patterns of the air below the rotational tube material spreading device. Wind patterns may be a result of blades of a transport device such as a drone or aircraft, blades on the rotational tube material spreading device and/or weather conditions at the time of material application. Rotational tube material spreading device 502 may comprise one or more altimeters, pressure transducers, gyroscopes, accelerometers, airspeed detectors, airspeed direction detectors, strain gages, weight detectors, sonar transceivers, ultrasound transceivers, radar transceivers, or LiDAR (light detection and ranging) transceivers that provide feedback and sensory guidance to a microprocessor or microcontroller. One or more positioning systems such as GPS, radio wave triangulation, cellular tower triangulation, and/or preprogrammed navigation coordinates may be used to distribute material to a predetermined land area. A material pattern 518 may be calculated to distribute material, such as, seeds along rows in a farmer's field. The calculation may be a result of a speed of the rotating drum, altitude of material ejection, wind effects, and movement speed and direction of the rotational tube material spreading device 502.

Figure 6:
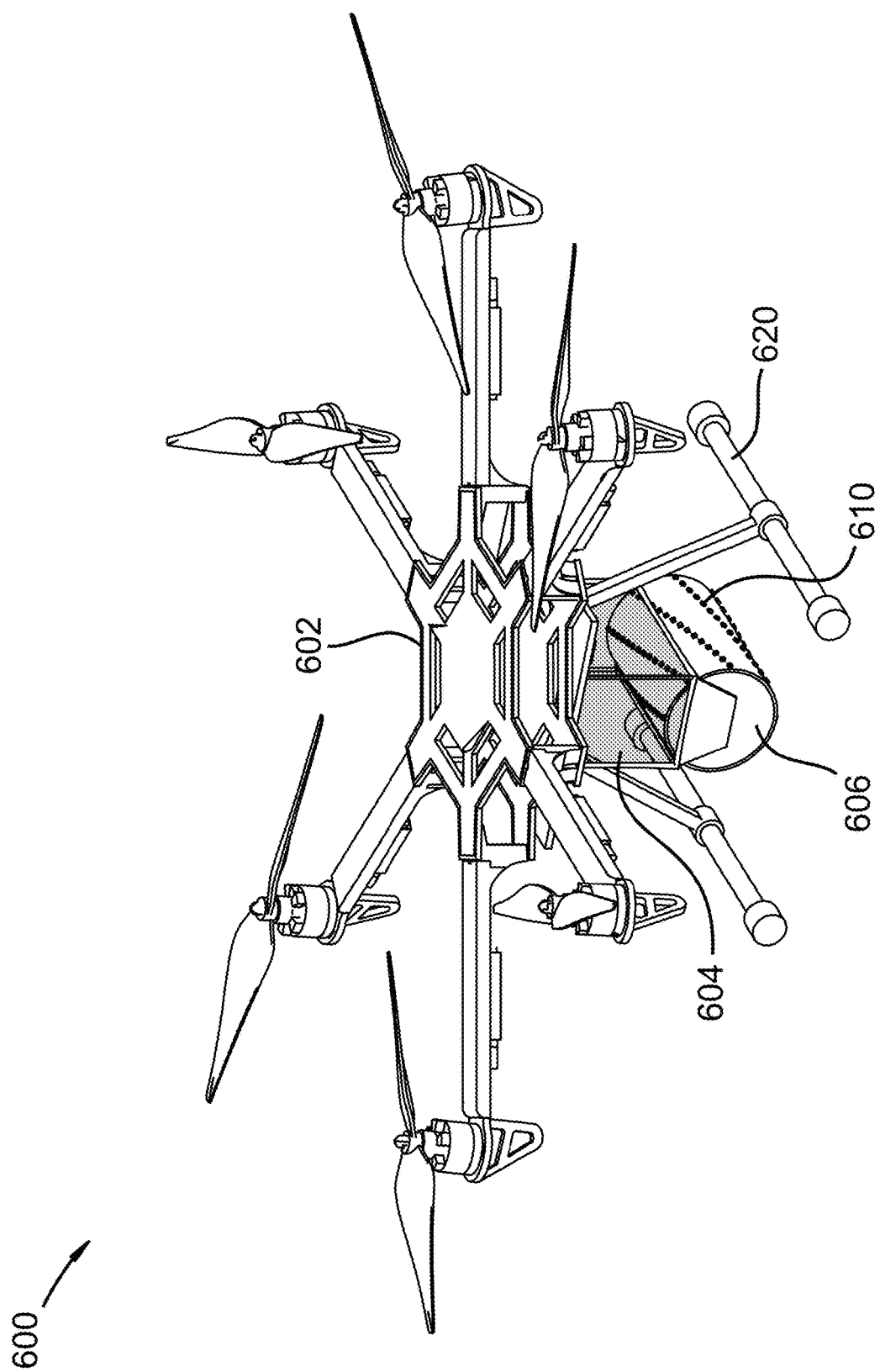
FIG. 6 is a perspective view of a rotational tube material spreading device in accordance with an embodiment of the invention.

FIG. 6 shows a rotational tube material spreading device 600 that includes transport 602, material hopper 604, rotational tube 606 and rotational tube features 610. Transport 602 may be a drone (shown in FIG. 6), unmanned aerial vehicle (UAV), a person holding material hopper 604 and walking along, a motor vehicle, a tractor, watercraft, a lawn mower, a bicycle, a motor cycle, an all terrain vehicle (ATV), or a utility terrain vehicle (UTV). Material hopper 604 is located above rotational tube 606 such that gravity feeds material in the hopper against a rotational surface of rotational tube 606. Rotational tube features 610 may be protruding features, recessed features, corrugated features, or a combination thereof. Rotational tube feature 610 may form spiraling lines, "V" shaped patterns, scrolling patterns, helical lines, or other patterns that allow material within material hopper 604 to be evenly distributed on the surface of rotational tube 606 within material hopper 604 and evenly extracted from within material hopper 604 as the material is being extracted, thus preventing cavitation at the interface. Material hopper 604 may be at least partially constructed of a lightweight fabric such as nylon, polyester, rayon, synthetic materials, cotton, or a combination thereof. Material hopper 604 may be additionally constructed of a lightweight frame material such as metals, metal alloys, tubing, plastic, carbon fiber, composite material, fiberglass, or a combination thereof for the purpose of supporting the lightweight material forming the hopper. Landing gear 620 may be attached to rotational material spreader 602 allowing protected landings and takeoffs.

Figure 7:
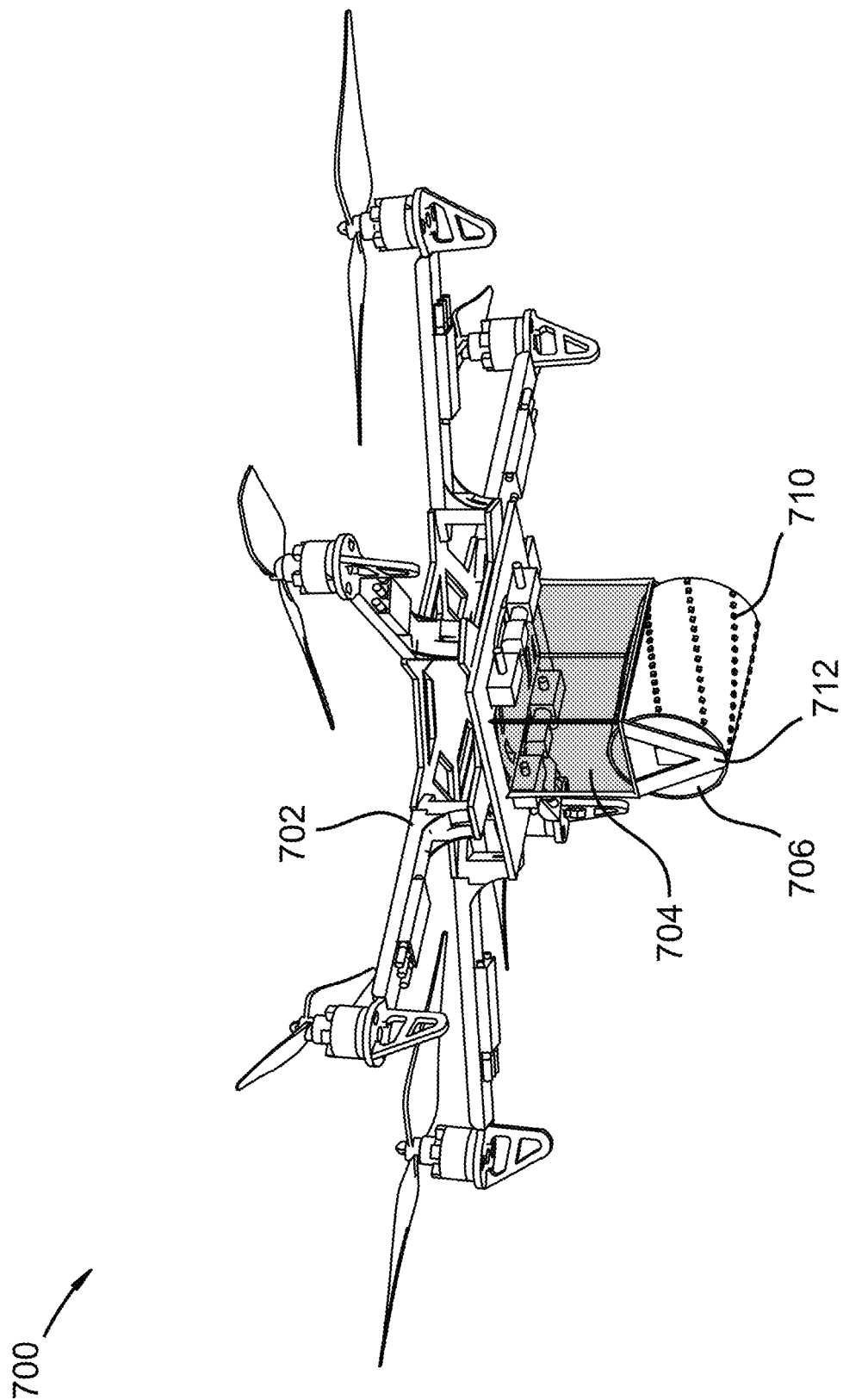
FIG. 7 is a perspective view of a rotational tube material spreading device in accordance with an embodiment of the invention.

FIG. 7 shows a rotational tube material spreading device 700 that includes transport 702, material hopper 704, rotational tube 706 and rotational tube features 710. Transport 702 may be a drone (shown in FIG. 7), unmanned aerial vehicle (UAV), a person holding material hopper 704 and walking along, a motor vehicle, a tractor, watercraft, a lawn mower, a bicycle, a motor cycle, an all terrain vehicle (ATV), or a utility terrain vehicle (UTV). Material hopper 704 is located above rotational tube 706 such that gravity feeds material in the hopper against a rotational surface of rotational tube 706. Rotational tube features 710 may be protruding features, recessed features, corrugated features, or a combination thereof. Rotational tube feature 710 may form spiraling lines, "V" shaped patterns, scrolling patterns, helical lines, or other patterns that allow material within material hopper 704 to be evenly distributed on the surface of rotational tube 706 within material hopper 704 and evenly extracted from within material hopper 704 as the material is being extracted, thus preventing cavitation at the interface. Material hopper 704 may be at least partially constructed of a lightweight fabric such as nylon, polyester, rayon, synthetic materials, cotton, or a combination thereof. Spreading device 700 may be configured to dock into a reloading station (not shown). Structural feature 712 may be used to position spreading device 700 into the reloading station. Structural feature 712 may be additionally used to supply recharging energy to one or more batteries of spreading device 700.

Figure 8:
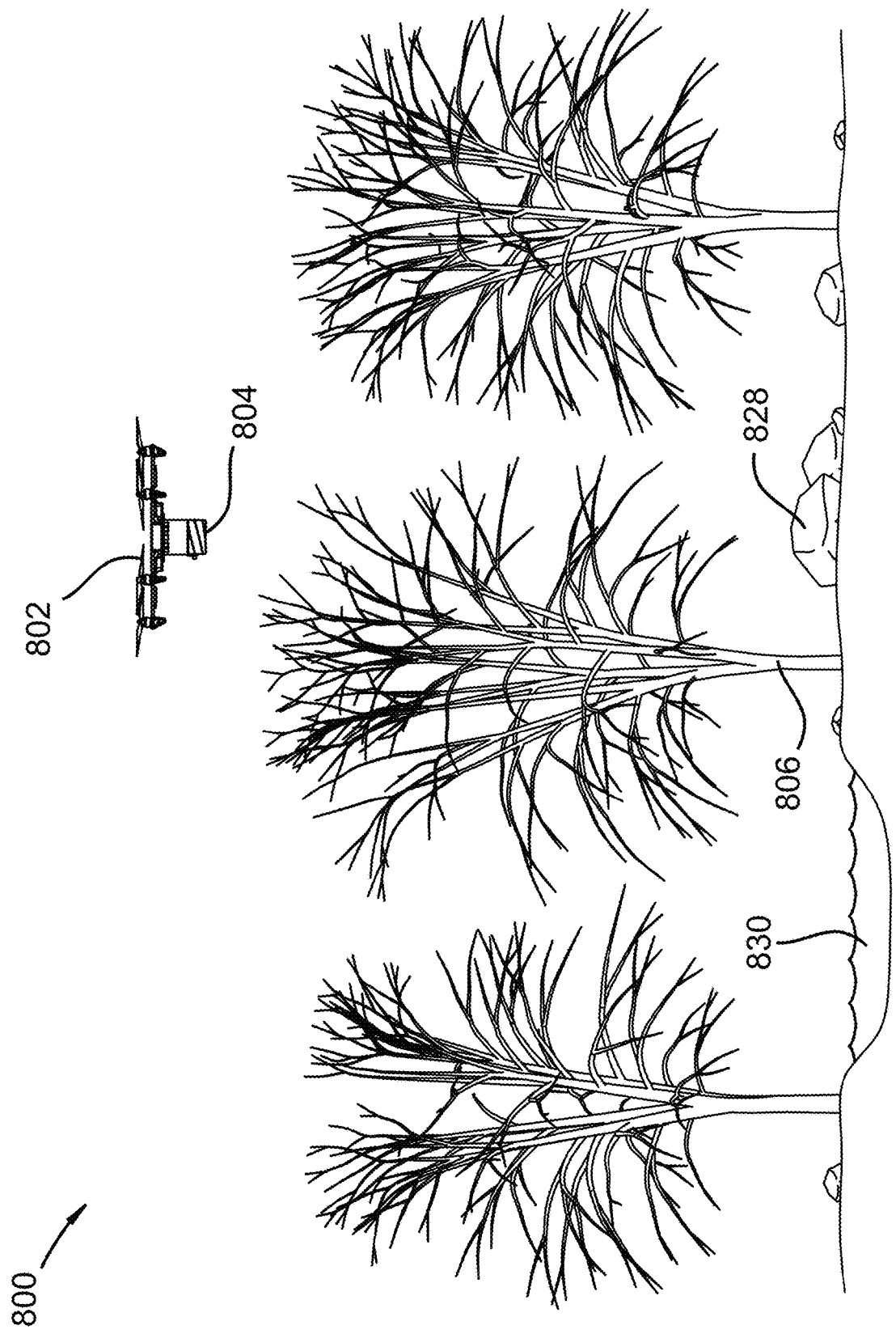
FIG. 8 is a side view of a rotational tube material spreading device in accordance with an embodiment of the invention.

FIG. 8 shows a rotational tube material spreading device 802 spreading material using rotational tube 804 above trees 806 ground obstacles/rocks 828 and water 830.

Figure 9:
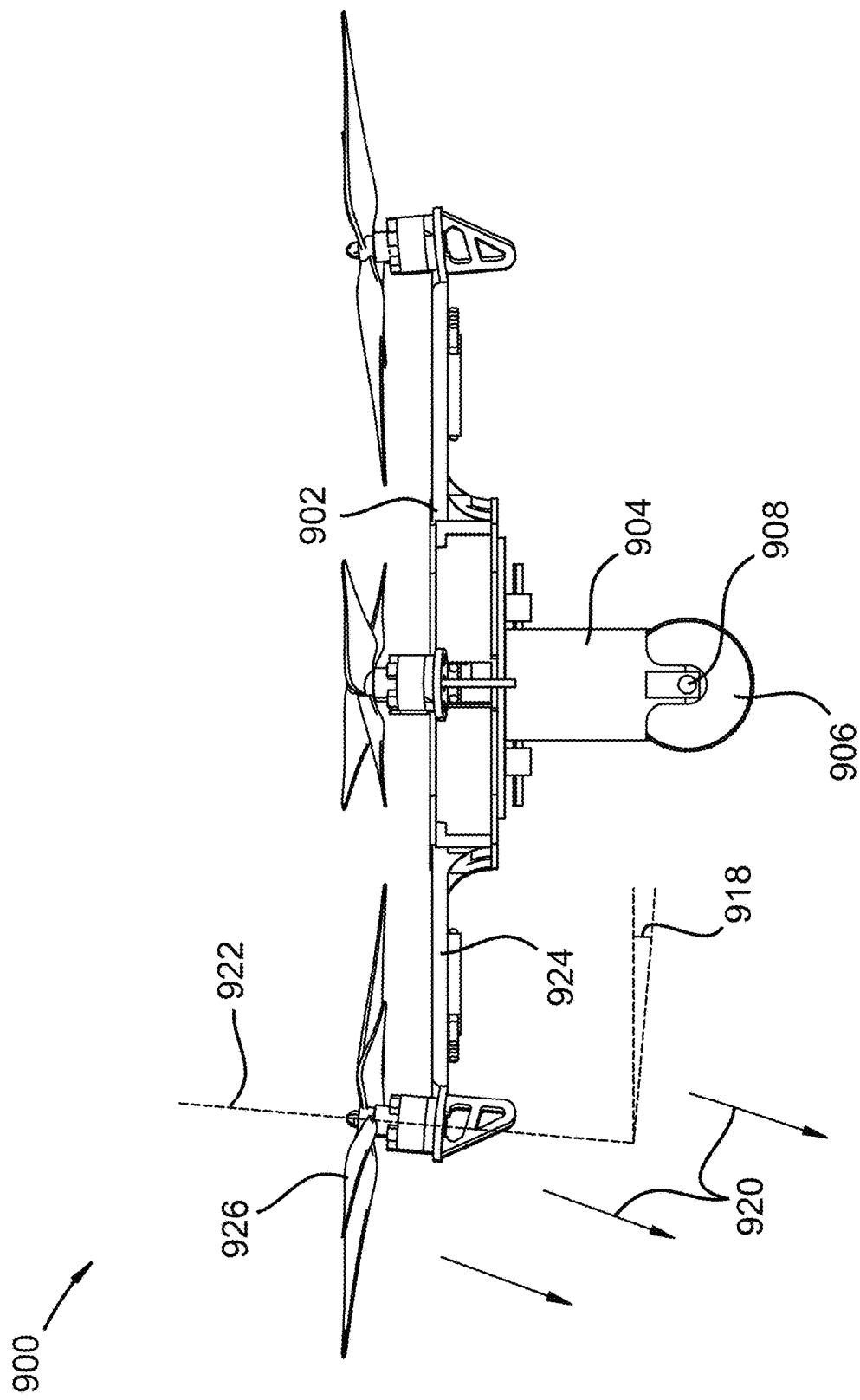
FIG. 9 is a side view of a rotational tube material spreading device in accordance with an embodiment of the invention.
Figure 10:
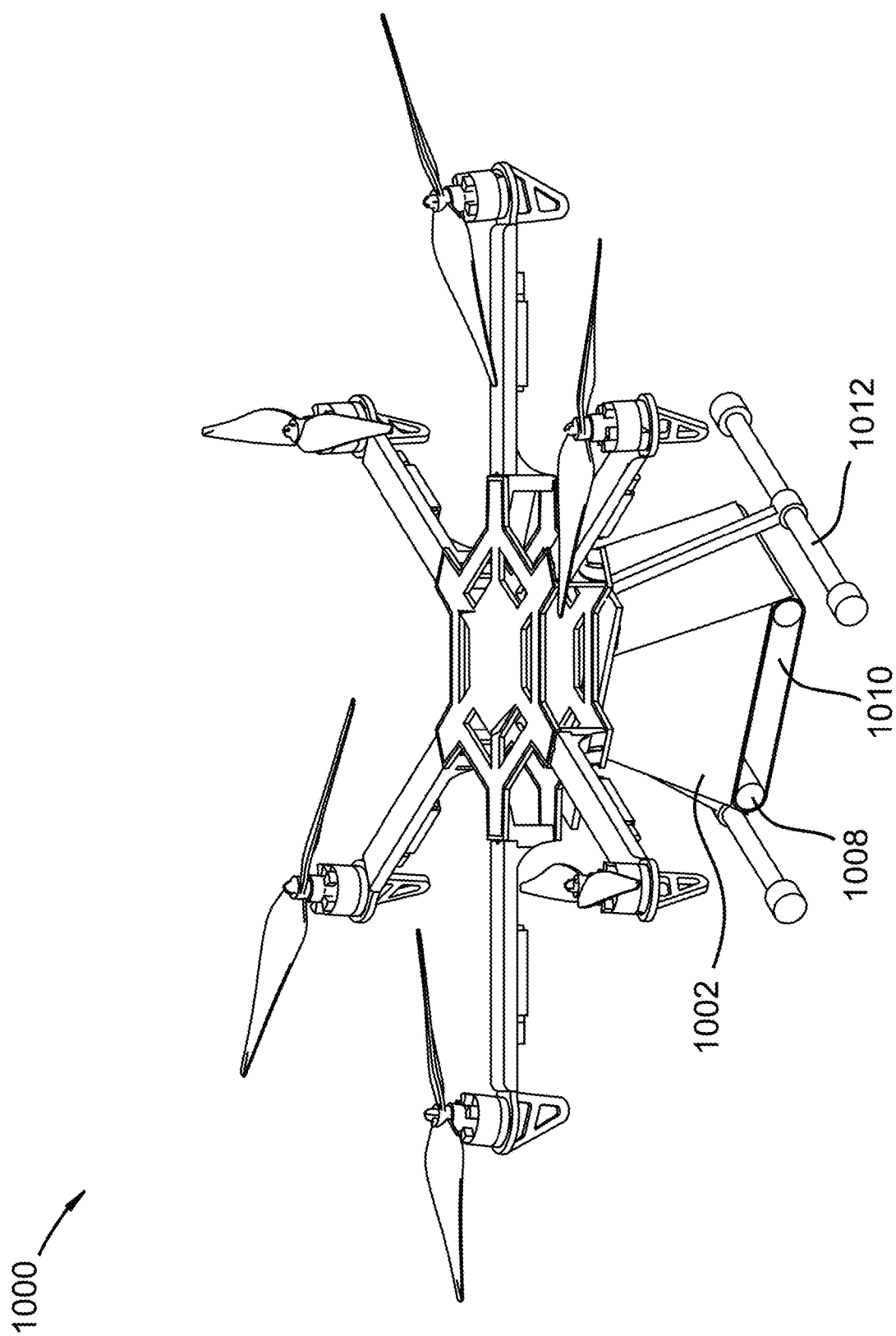
FIG. 10 is a perspective view of a rotational tube material spreading device in accordance with an embodiment of the invention.
Figure 11:
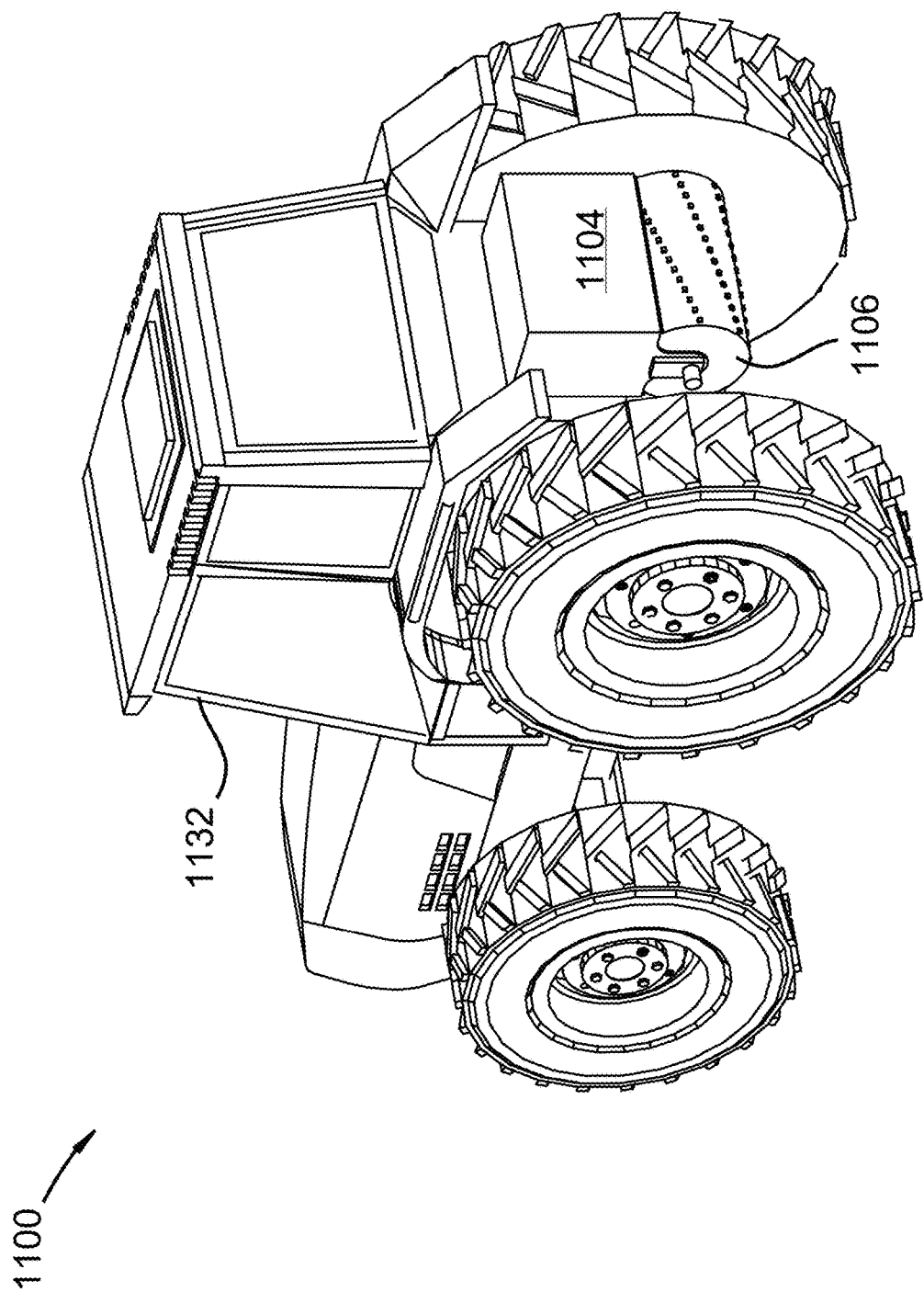
FIG. 11 is a perspective view of a rotational tube material spreading device in accordance with an embodiment of the invention.
Figure 12:
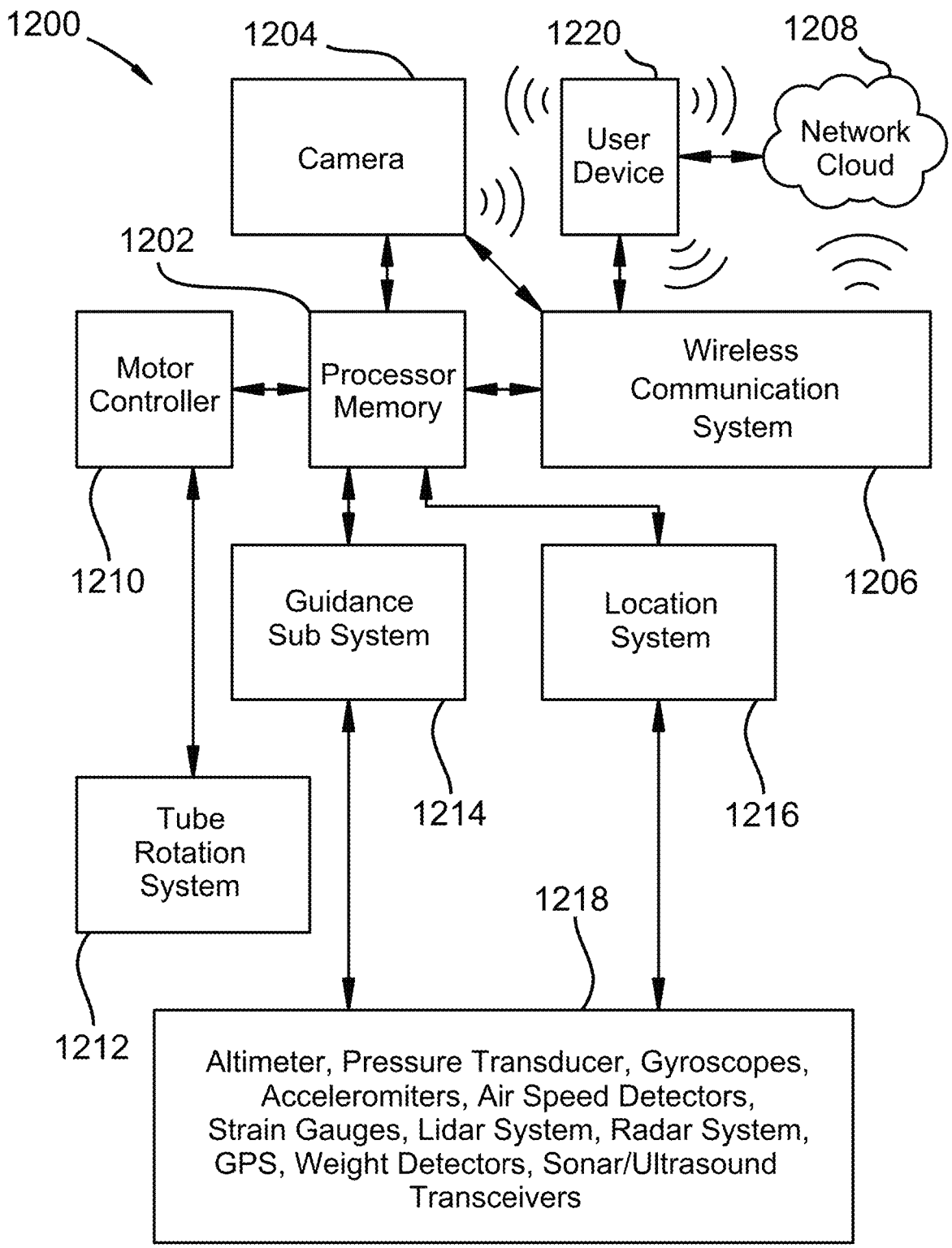
FIG. 12 is a functional block diagram of a rotational tube material spreading device control system in accordance with embodiments of the invention.

FIG. 9 is a side view of a rotational tube material spreading device in accordance with an embodiment of the invention. Rotational tube material spreading device 900 includes blades 926 that are angled 918 giving an outward air current 920 allowing material expelled from rotating tube 906 to be blown out away from rotational tube material spreading device 900. The angle 918 related to the angle of the axis of the blades 926 relative to a defined plane 924 of the transport device 902. The angle 918 may be adjustable between 2 degrees and 90 degrees allowing for material application radius.

FIG. 10 is a perspective view of a rotational tube material spreading device 1000 in accordance with an embodiment of the invention. Rotational material spreading device has rotational tubes, gears 1008, and belt 1010 that expels material from a generally trapezoidal hopper 1002. Landing gear 1012 may also be used to provide a landing structure for rotational material spreading device 1000.

FIG. 11 is a perspective view of a rotational tube material spreading device in accordance with an embodiment of the invention. Transport device 1132 is a ground based transport device. This ground-based transport device may be a tractor, motor vehicle, lawnmower, bicycle, motorcycle, ATV, UTV or other ground-based device. Rotational tube 1106 and material hopper 1104 may be attached to the front, back or both the front and back of a ground based transport device 1132.

Aspects of the present invention are described herein with reference to flowchart illustrations and/or block diagrams of methods, apparatus (systems), and computer program products according to embodiments of the invention. Those of skill in the art will understand that each block of the flowchart illustrations and/or block diagrams, and combinations of blocks in the flowchart illustrations and/or block diagrams, may be implemented by computer readable program instructions. Additionally, those of skill in the art will recognize that the system blocks and method flowcharts, though depicted in a certain order, may be organized in a different order and/or configuration without departing from the substance of the claimed invention.

FIG. 12 is a functional block diagram 1200 of a rotational tube material spreading device control system in accordance with an embodiment of the invention. Control system 1200 may include a processor and memory 1202. Processor 1202 may be a microcontroller such as an Arduino, Raspberry Pi, micrologic, an embedded application specific controller, a computer, a smart phone, or any other processor/memory device. Processor device 1202 may by attached to the rotational tube spreader or be an integral component of a transport device. Memory 1202 may contain a computer program product capable of providing digital video processing, guidance system functions, navigation functions, location functions, signal filtering, signal feedback control, motion feedback control, monitoring functions, spreader functions, spreader density distribution functions, battery charging functions, overall system health functions, landing functions, and other functions described and presented with the disclosure herein. Processor and/or memory functions may be performed in a remote database server 1208 or a cloud based computing system 1208 and sent back to the local rotational spreader device. Processor and/or memory functions may be shared with additional local or remote processors to accomplish near real-time signal processing and control of a rotational spreader device. Wireless communication system 1206 may be imbedded within processor 1202 or may be an independent processing system using an additional processor remote from processor 1202. Wireless communication system 1206 may include CDMA, GSM, Global, WiFi, Bluetooth, NFC, or other proprietary wireless systems such as LoRa. Wireless communication system 1206 may interface with remote network resources including user devices through a wide area network 1208 or directly to the user device 1220. A user device 1220 may be connected to wireless communication system 1206 wirelessly or be wire enabling programming functions and control functions of a rotational spreader device. Motor controller 1210 may be a speed control system controlling voltage, current, duty cycle, phase and/or frequency to a motor of tube rotation system 1212. Tube rotation system 1212 may include one or more position sensors, hall sensors, proximity sensors, motors, and/or mechanical switches allowing for motor control of a rotational tube. Camera 1204 may be connected to user device 1220, processor 1202, and/or cloud network 1208. Camera 1204 may be used to gather data such as position data, ground condition data, crop data, weather data, terrain data, spreader density data, and/or spreader pattern data. Guidance subsystem 1214 and navigation/location subsystem 1216 may be embodied in a computer program product and ran locally in processor 1202 or may be ran remotely in a wide area network processor 1208, or may be ran in a combination thereof. Sensor inputs 1218 for the guidance subsystem 1214 and navigation/location subsystem 1216 may be may comprise one or more altimeters, pressure transducers, gyroscopes, accelerometers, mechanical switches, airspeed detectors, airspeed direction detectors, strain gages, weight detectors, sonar transceivers, ultrasound transceivers, radar transceivers, or LiDAR (light detection and ranging) transceivers that provide feedback and sensory guidance to a microprocessor, microcontroller, or remote database processor. One or more positioning systems such as GPS, radio wave triangulation, cellular tower triangulation, and/or preprogrammed navigation coordinates may be used to distribute material to a predetermined land area. A battery system (not shown) provides electrical power to components the rotational tube control system 1200. The battery system may be positioned on or in the rotational tube spreading device allowing for easy removal and charging of the batteries.

Figure 13:
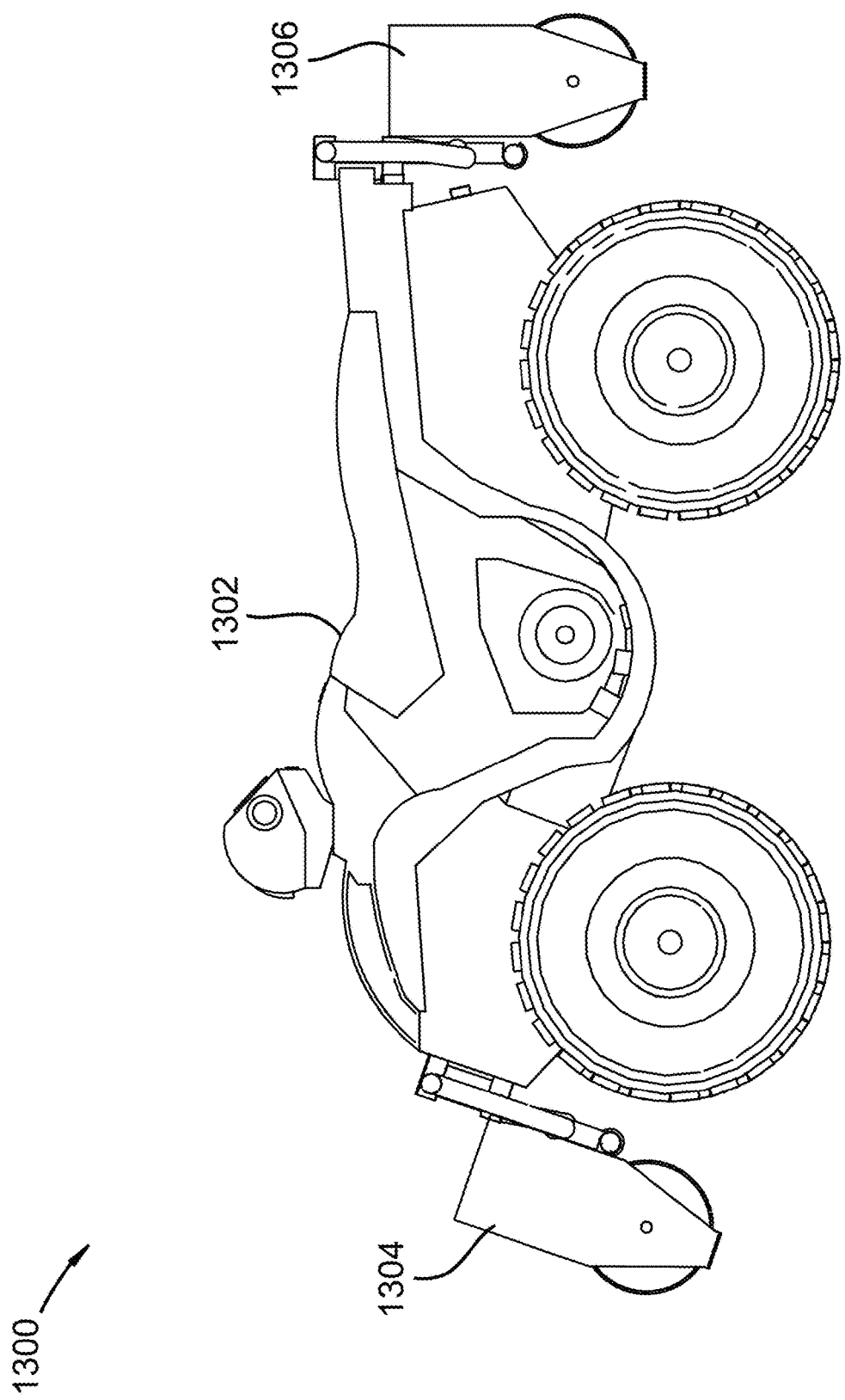
FIG. 13 is a side-view of two rotational tube material spreading devices on a utility vehicle in accordance with an embodiment of the invention.

FIG. 13 shows a utility vehicle 1300 with a front rotational spreader device 1304 and a rear rotational spreader device 1306. Utility vehicle 1300 may be an ATV, UTV, tractor, lawn mower or other ground-based device. Utility vehicle 1300 may be a small four wheel drive allowing for use in areas with rough terrain as shown in FIG. 8. One or more rotational spreader devices may be attached as shown. Each spreader 1304/1306 may contain different material such as fertilizer in one spreader and seeds in the other spreader.

The apparatus and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A spreader device for an aerial vehicle comprising:
a hopper axially mounted above a generally circular hollow tube, the generally circular hollow tube forming a semi-circular hopper floor of an interior area formed by the hopper;
a drive motor assembly attached to the hopper and operable to rotate the generally circular hollow tube within at least a portion of the interior area formed by the hopper;
wherein a height of the aerial vehicle, a speed of a rotation of the hollow tube, a speed of travel of the aerial vehicle, and a propeller airstream of the aerial vehicle create a distribution pattern for one or more contents within the hopper as the spreader device spreads the one or more contents of the hopper outside of the interior area of the hopper; and
wherein the hopper is at least partially constructed of a fabric.

2. The spreader device of claim 1, wherein the generally circular hollow tube comprises an outer surface with one or more: protruding features, recessed features, corrugated features, or a combination thereof.

3. The spreader device of claim 2, wherein a helical pattern, a "V" shaped pattern, or a scrolling pattern is formed on the outer surface as a result of the protruding features, the recessed features, the corrugated features, or the combination thereof.

4. The spreader device of claim 2, wherein the drive motor assembly is attached to the hopper and located inside of the generally circular hollow tube.

5. The spreader device of claim 1, wherein the hopper is at least partially enclosed by a woven fabric.

6. The spreader device of claim 1, further comprising a variable speed motor that powers the drive motor assembly.

7. The spreader device of claim 1, wherein the aerial vehicle attaches to the spreader device by one or more sliding rods.

8. The spreader device of claim 7, wherein the spreader device spreads the one or more contents of the hopper in a uniform density based on the speed of travel of the aerial vehicle and a rotational speed of the variable speed motor.

9. The spreader device of claim 8, further comprising a camera system.

10. The spreader device of claim 9, wherein the aerial vehicle comprises a guidance system.

11. The spreader device of claim 10, wherein a start trigger and a stop trigger of the spreader device are at least partially determined based on a signal from the guidance system or a landing apparatus of the aerial vehicle.

12. The spreader device of claim 11, wherein the guidance system comprises one or more wireless location detection systems.

13. The spreader device of claim 12, wherein the guidance system includes one or more altimeters, pressure transducers, gyroscopes, accelerometers, airspeed detectors, airspeed direction detectors, strain gages, weight detectors, sonar transceivers, ultrasound transceivers, radar transceivers, or LiDAR (light detection and ranging) transceivers.

14. The spreader device of claim 13, wherein the spreader device includes a motor controller that controls the variable speed motor.

15. The spreader device of claim 14, wherein the camera is used to at least partially control the speed of the variable speed motor.

16. The spreader device of claim 15, wherein the camera system records a distribution pattern and density as the one or more contents of the hopper is expelled by the generally circular hollow tube as the generally circular hollow tube rotates.

17. The spreader device of claim 1, wherein the diameter of the generally circular hollow tube is larger than a width of the hopper.

18. The spreader device of claim 1, wherein the spreader device spreads the one or more contents of the hopper in a uniform pattern and density.

* * * * *